Oct. 7, 1969 N. LANE 3,471,071

TAPE-PLAYING APPARATUS

Filed Oct. 30, 1967 3 Sheets-Sheet 1

INVENTOR:
NORMAN LANE
BY Kurt Kelman
AGENT

Oct. 7, 1969 N. LANE 3,471,071

TAPE-PLAYING APPARATUS

Filed Oct. 30, 1967 3 Sheets-Sheet 2

INVENTOR:
NORMAN LANE
BY Kurt Kelman
AGENT

INVENTOR:
NORMAN LANE
BY Kurt Kelman
AGENT

1

3,471,071

TAPE-PLAYING APPARATUS

Norman Lane, Halesowen, England, assignor to BSR Limited, Old Hill, England, a British company Filed Oct. 30, 1967, Ser. No. 678,945
Int. Cl. G03b *1/56*
U.S. Cl. 226—89 9 Claims

ABSTRACT OF THE DISCLOSURE

A magnetic tape playing apparatus for use with tape provided in a removable cassette and in which movement of the tape is achieved solely by engagement with a capstan spindle wherein a transporter means is provided which is releasably engageable with the cartridge and transports the cartridge between an operative position in which the tape is urged into contact with the capstan spindle and in an operative position and wherein the tape is spaced from the capstan spindle and there being trip means which are operated when the tape has reached a predetermined position (such as at the end of playing of the cartridge) to cause the transporter means to move the cartridge from its operative to its inoperative position.

BACKGROUND OF THE INVENTION

This invention relates to apparatus for reproducing sound from prerecorded magnetic tape of the kind in which the prerecorded tape is provided in a holder generally known as a cartridge or cassette, in which the tape is coiled on a reel mechanism in such manner that it can be uncoiled, transported past an opening in the cartridge or cassette and then recoiled within the cartridge or cassette. Such a loaded cartridge is used in play-back apparatus in which, when the cartridge is introduced, the tape makes contact with the magnetic sound reproducing head as the tape is transported past the opening in the cartridge and the motion of the tape is obtained by means of a rotary driving member such as a spindle, generally known as a capstan spindle, which engages the outwardly presented face of the tape in cooperation with a rotary pressure roller or the like engaging the inwardly presented face of the tape, such rotary pressure roller being mounted within the cartridge. The capstan spindle is associated with a heavy fly-wheel generally known as a "capstan," which ensures that the capstan spindle rotates at a constant speed. Apparatus of this type will be referred to hereinafter as "of the type described."

Apparatus of the type described, when operating, will play the whole tape and will then replay the tape until the cartridge is ejected into an inoperative position and the apparatus is switched off by a manual act of the user and this necessitates the user having to pay close attention to the apparatus in order to switch it off at the end of the programme provided on the tape and it is not always convenient, especially when the apparatus is mounted in a road vehicle, for this close attention to be directed to the apparatus at the required instance. In addition it is most important that the pressure roller is not left loaded against the capstan spindle when the cartridge has been played or when the apparatus is switched off and thus to ensure that this does not occur, an automatic cartridge ejector mechanism is required.

It is an object of the present invention to provide a tape playing apparatus of the kind specified which affords automatic ejection of the cartridge at a predetermined instant.

SUMMARY OF THE INVENTION

According to the invention, in an apparatus for tape provided as an endless loop in a replaceable cartridge

2 and including a magnetic transducer head engageable with the tape, a power driven capstan, a power driven capstan spindle engageable with the tape to provide the sole drive to the tape to transport the tape past the magnetic transducer head, a transporter means releasably engageable with said cartridge and operative to move said cartridge between an operative position wherein said tape is resiliently urged into contact with said capstan spindle and an inoperative position wherein said tape is spaced from said capstan spindle, and biasing means biasing said cartridge into said operative position in the direction to urge said tape against said capstan spindle, the improvement comprising drive means to drive said transporter means from said capstan to cause said transporter means to move said cartridge between said positions and means disengaging said capstan from said drive means when said cartridge is in either of said positions and the trip means automatically operated when the tape has reached a predetermined playing position to cause the transporter means to move the cartridge from said operative to said inoperative position.

The trip means may be arranged, when operated, to close an electrical switch whereby a solenoid is operated to cause the transporter means to move the cartridge into its inoperative position.

A tape playing apparatus constructed in accordance with the present invention will now be described in more detail by way of example, with reference to the accompanying drawings.

DESCRIPTION OF THE PREFERRED EMBODIMENT

In order to avoid unnecessarily prolix description only the construction of the transporter means, trip means and their associated parts will be described in detail herein, other parts of the tape-playing apparatus merely being mentioned briefly so that the invention may be fully understood, it being appreciated that these other parts of the apparatus do not form part of the present invention.

Figure 1:
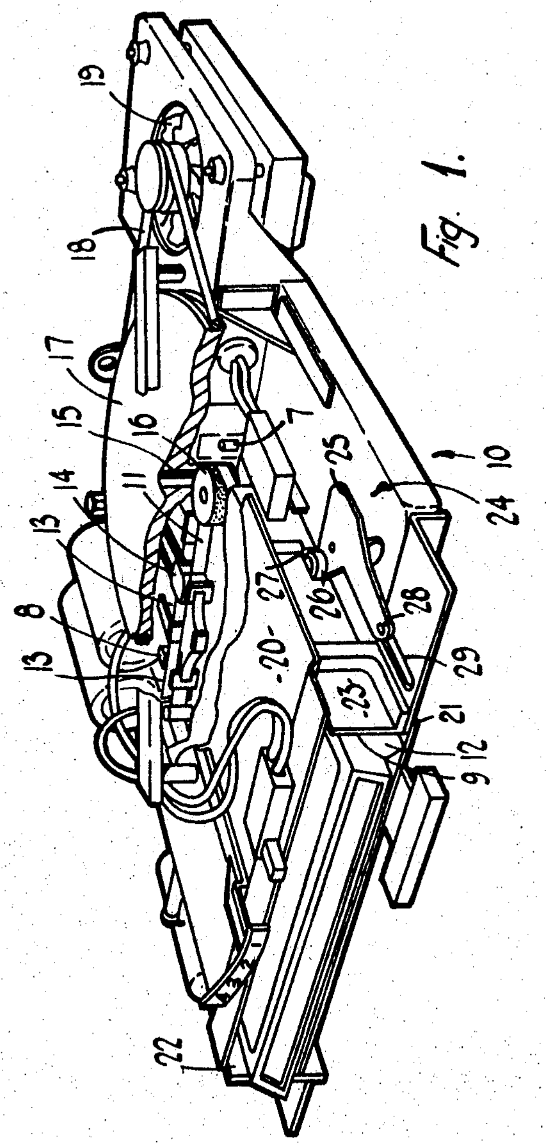
FIGURE 1 is a perspective view of a tape playing apparatus embodying the invention, with the outer casing removed and with part broken away and taken from above, the front, and to one side.
Figure 2:
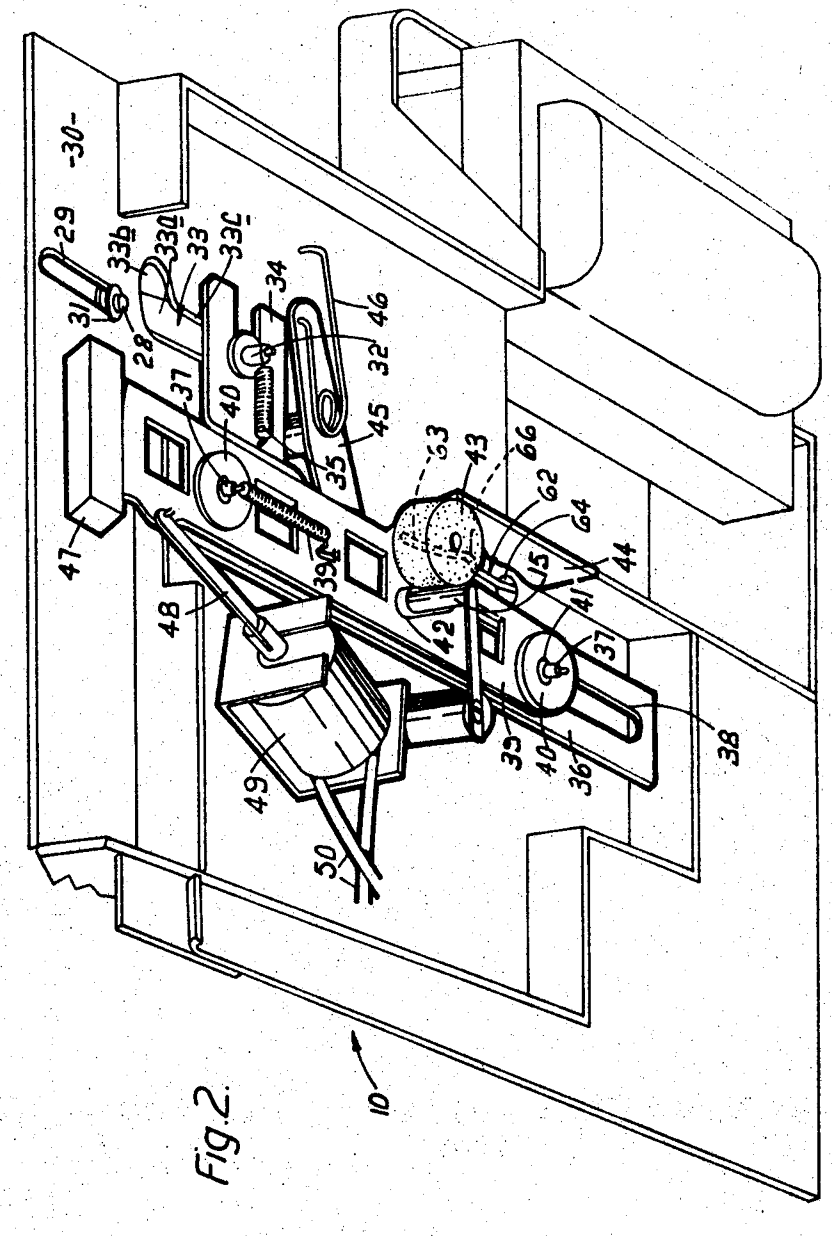
FIGURE 2 is another perspective view of the tape playing apparatus of FIGURE 1 taken from below, the front and to the other side, and, FIGURE 3 is a detail view to an enlarged scale, of the trip means of the present invention.

The tape-player is illustrated generally at 10 in FIGURES 1 and 2 and comprises a prerecorded tape 11 provided in a holder 12 generally known as a cartridge, in which the tape is coiled on a reel mechanism, not shown, transported past openings 13 in the cartridge 12 and then recoiled within the cartridge. The cartridge is arranged to be slidably loaded into a cartridge receiving cavity 9 in the apparatus 10 and suitable catch means are provided to hold the cartridge 12 in position and to resiliently urge it inwardly of the apparatus 10. When the cartridge 12 has been loaded into the apparatus 10 it is engaged with the transporter means which moves it between its inoperative position and an operative position wherein the cartridge 12 is urged strongly and resiliently inwardly of the apparatus so that the tape 11 makes contact with a magnetic sound reproducer head 14 as the tape is transported passed the opening 13 in the cartridge 12 and the motion of the tape is derived from a capstan spindle 15 against which the outwardly presented face of the tape 11 is resiliently urged by means of a rotary pressure roller 16 which is engaged with the inwardly presented face of the tape, which pressure roller is mounted permanently within the cartridge 12. The capstan spindle 15 is rotatably mounted in the apparatus 10 on bearings, not shown, and is non-rotatably connected to a heavy flywheel or capstan 17 which is driven by a flexible band 18 from an electric motor 19.

The above description forms a very brief description of a cartridge type of a tape-playing apparatus to which the present invention is applied and the features which provide the present invention will now be described in more detail.

The cartridge receiving cavity 9 is of generally rectangular parallelopiped shape and has opposed, spaced apart, top and bottom walls 20 and 21, a side wall 22 extending normally therebetween at one side thereof, and an apertured opposite side wall 23. The side wall 22 is provided with three rollers, not shown, rotatable about a vertical axis and arranged to engage with one side of the cartridge 12 when it is loaded into the apparatus. The top and bottom walls 20 and 21 also engage the cartridge 12 but are not provided with rollers. An abutment stud 7 carried by a main slide plate, hereinafter to be described, projects into the cavity 9 adjacent its inner end through a slot in the bottom wall 21 and is arranged to abut against the apertured end wall of the cartridge 12. A catch means 24, comprising a bell crank lever 25 having a roller 26 mounted at the free end of one limb thereof is mounted on the apparatus so that the roller 26 projects through an aperture in the wall 23 and engages with the conventional V-shaped recess 27 in the side of the cartridge 12, whilst the other limb of the lever 25 lies generally parallel to the side of the cavity 9. The roller 26 of bell crank lever 25, as hereinafter to be explained, resiliently engages the cartridge 12 and tends to urge the cartridge 12 towards the wall 23 and it is for this reason that the rollers are provided so that the cartridge 12 slides easily within its cavity.

At the free end of the other limb of the lever 25 there is provided a downwardly depending pin 28 which passes through a narrow slot 29 formed in a fixed part 30 of the apparatus and which extends parallel to the side walls 22, 23 of the cartridge receiving cavity 9. A circlip 31, see FIGURE 2, is engaged in a groove in the pin 28 to hold the lever 25 in position.

At the junction between the two arms of the bell crank lever 25 a further downwardly depending pin 32 is provided which projects through a further slot 33. The part of the pin 32 projecting through the slot 33 is engaged between the arms of a fork member 34 and a coil tension spring 35 is connected between the pin 32 and the member 34 to urge the pin 32 into engagement with the base of the fork member. The slot 33 includes a first, abutment portion **33*a* which extends parallel to the side walls 22, 23 of the cartridge receiving cavity 9 and a second, release portion 33*b* which extends generally perpendicularly away from the adjacent side wall 22**.

The fork member 34 is formed integrally with a main slide plate 36, as hereinafter to be described, and as the main slide plate moves back and forth parallel to the sides 23, 22 between its operative and inoperative positions then the fork member 34 will cause the bell crank lever 25 to also slide back and forth and as the roller 26 thereof is engaged with the recess 27 of the cartridge 12 the cartridge will also be moved back and forth between its operative and inoperative positions.

When the main slide plate 26 is in the inoperative position, i.e. is closest to the front of the cartridge receiving cavity 9 the pin 32 is aligned with the release part **33*b* of the slot 33 and so the bellcrank lever 25 can pivot about the pin 28 and so the roller 26 can move laterally out of the recess 27 to enable a cartridge to be unloaded from or loaded into the apparatus. When the main slide plate 26 is moved inwardly of the apparatus to the operative position the pin 32 is prevented from outward lateral movement away from the recess 27 by engagement with an abutment edge 33*c* of the abutment part 33*a* of the slot 33 and so the roller 26 is held positively within the recess 27**.

The catch means 24 serves only to hold the cartridge 12 relative to the main slide plate 36 and does not itself move the cartridge 12 between its operative and inoperative positions and so does not require any considerable spring pressure. The strength of the spring 35 needs only to be sufficient to urge the roller 26 into the recess 27, the roller 26 being held within the recess 27 by virtue of engagement with the side **33*c* of the slot 33, and thus very little spring pressure has to be overcome to enable the cartridge 12 to be loaded into, or unloaded from, the apparatus 10**. The effort required to move the cartridge between its inoperative position and its operative position, wherein the tape is urged strongly against the capstan spindle, is provided by the movement of the main slide plate which is communicated to the cartridge by the catch means.

The fork member 34 is formed integrally with the main slide plate 36 which is mounted for sliding movement on the apparatus 10 my means of spindles 37 provided on the underside of the bottom 21 of the cartridge receiving cavity 9 which engages with longitudinally extending slots 38 formed in the main slide plate 36. An extension of the capstan spindle 15 extends through a third slot, not shown, in the main slide plate 36 and a flange 44 is formed integrally at one side of the main slide plate 36 adjacent the slot formed for the capstan spindle 15.

An actuating slide 39 is mounted on the apparatus 10 below the main slide plate 36 by means of the spindle 37 which engages within slots, not shown, in the slide 39. Washers 40 and circlips 41 are provided on the spindle 37 to maintain the slide 39 and main slide plate 36 in position. The slot in the actuating slide 39 nearest to the opening of the cartridge receiving cavity 9 extends longitudinally of the slide 39, but the slot at the other end of the slide 39 is of triangular shape, one side of the triangle lying parallel to the axis of the slide 39 whilst the other side is inclined thereto in the direction away from the flange 44, the wider end of the slot being nearest to the capstan spindle 15. A central slot 42 which is parallel-sided and inclined to the longitudinal axis of the slide 39 is provided for the capstan spindle 15.

A rubber pulley 43 is rotatably mounted on the slide 39 and is moved into and out of the gap between the capstan spindle extension 15 and the flange 44 when the slide 39 is moved to and fro, the triangular shaped slot guiding the slide 39 so that the pulley is centered in the gap and the slot 42 enabling the lateral and longitudinal movement of the slide 39 to occur. An arm 45 is pivoted adjacent its mid-point to the apparatus 10 and is pivotally connected at one end to the main slide plate 36 and is acted on at the other end by a toggle spring 46. The actuating slide 39 has a hand-engageable knob 47 at its outer end and a coil tensioning spring **39*a* is connected between the slide 39 and the apparatus 10 to urge the slide 39 outwardly of the apparatus 10. A link 48 connects the slide 39 to a solenoid 49 fixed to the apparatus 10**.

Figure 3:
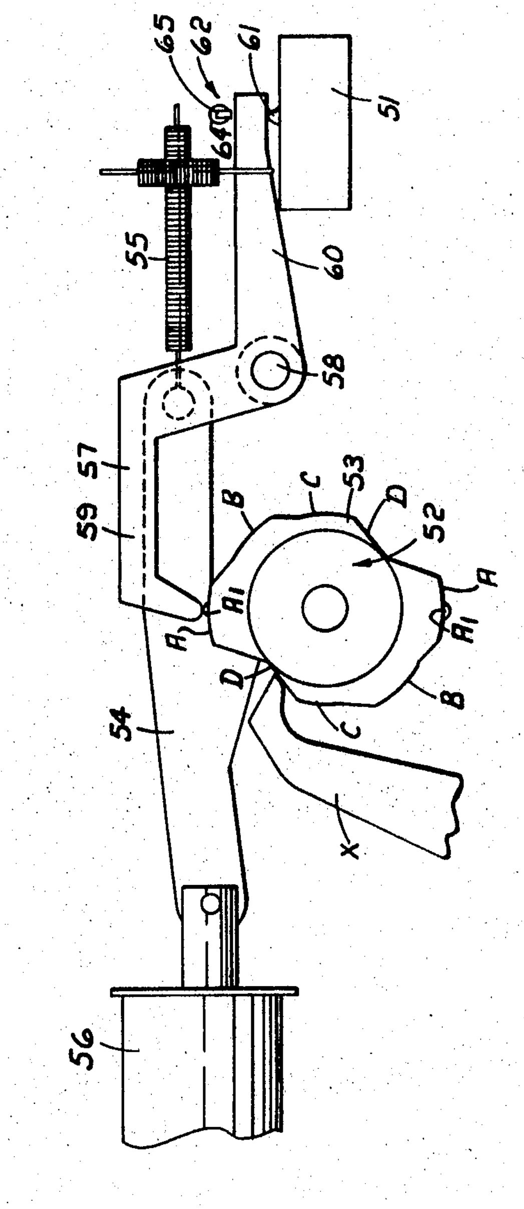

The solenoid 49 is connected by wires 50 to a micro-switch 51 shown in FIGURE 3. The micro-switch 51 is actuated as hereinafter to be described so that the solenoid 49 is energized automatically when a complete cartridge has been played. When the solenoid 49 is energised the actuating slide 39 is moved inwardly of the apparatus 10 so that the pulley 43 is moved into the gap between the capstan spindle 15 and the flange 44. As the capstan spindle is rotating clockwise, as seen in FIGURE 3, the pulley 43 is rotating anti-clockwise and so the flange 44 is moved outwardly and hence the main slide plate 36 is moved over the dead centre position of the toggle spring 46 and thus the fork member 34 and the catch means 24 are also moved outwardly and so the cartridge 12 is moved from its operative to its inoperative position automatically at the end of playing a complete cartridge.

The trip means for actuating the switch 51 will now be described.

The trip means comprises a cam 52 mounted for rotation about a vertical axis and having a radial cam surface 53, hereafter to be described, and eight ratchet teeth, not shown, spaced beneath the surface 53 and engaged by a click member 54 which is moved by a coil tension spring 55 when a solenoid 56 is de-energised after energisation. The solenoid 56 is energised by means of a metal foil provided on the tape at the end of each track and is arranged to engage with two contact members 8, see FIGURE 1, fixed at the apparatus 10 and abutting at the tape, thereby completing the electrical circuit to the solenoid 56.

The cam surface 53 includes two portions A of maximum radial extent from the axis of rotation of the cam, these portions A are provided with further raised portions A1 and a bell crank lever 57 is pivotally mounted intermediate its ends on the pivot 58 so that a cam arm 59 thereof bears on the cam surface 53, whilst the other arm 60 thereof bears on a plunger 61 of the microswitch 51, the plunger 61 being spring urged outwardly of the switch 52 into an extended position when the switch is open.

In use, as the tape is played at the end of each track the metal foil on the tape engages the contacts 8 and thus energises the solenoid 56 and so rotates the cam 52 through 45°. When a complete tape programme of four tracks has been played the cam 52 will have been rotated through 180° and thus one of the portions A1 of the cam will act upon the bell crank lever 57 so that the switch 51 is closed thereby, thus operating the solenoid 49 and moving the actuating member 39 inwardly so that the rubber pulley 43 thereon is moved into the gap between the rotating capstan spindle 15 and the flange 44 on the main slide plate 36, thus moving the main slide plate 36 and the cartridge 12 from their operative position to their inoperative position.

It will be appreciated that the form of cam described above results from the number of tracks provided on the tape. The number of teeth on the cam and number of portions A1 may be varied at will, the only requirement being that a portion A1 is caused to act on the bell crank lever 57 when all the tracks of the tape have been played. For example, in the above example where the tape has four tracks a single portion A1 may be provided on the cam and the cam provided with four teeth. This arrangement is not so suitable as the arrangement described above as it is difficult to arrange for the cam to be turned through 90° for each stroke of the click member. Alternatively, four portions A1 may be provided and sixteen teeth. In the case where a different number of tracks are provided on the tape then the number of teeth and bell crank lever engaging portions A will have to be adjusted correspondingly.

It is very convenient for the cam 52 to be used to provide the following facilities. Firstly, to provide a means for moving the transporter head transversely across the tape to play the four tracks (or such number of tracks as are provided on the tape). Secondly, to provide an indicator means to indicate visually which track is to be played. These facilities are conveniently provided by forming the cam surface 53 with two sets of four portions A, B, C, D, which in addition to being engaged by the bell crank lever 57, which is only caused to actuate the switch 51 when it contacts the cam portion A, may also be engaged by a cam follower. X. The cam follower X is arranged to move a pointer to indicate the track being played. The cam 52 may also be provided with a cam surface having two sets of four portions of varying height, not shown, on its upper surface, and a member connected to the transducer head may rest upon the surface and thus move the head up and down and hence transversely across the tape, as the cam is rotated. The movements of the head and of the track indicator are synchronised so that the correct position of the head is indicated. The means described briefly above for moving the transporter head and indicating the position thereof is described and claimed in my copending application number.

Due to the speed at which the cam rotates and the necessarily short peripheral length of the portion A1 of the cam corresponding to the end of the programme on the tape, the switch 51 would remain closed for an insufficient period to operate the solenoid 49 for a sufficient time for ejection to be caused to occur and therefore a holding means is employed to hold the switch 51 closed after the said portion A1 of the cam has passed the cam arm 59.

The holding means comprises, see FIGURES 2 and 3, a leaf spring 62 secured at one end 63 to the underside of the bottom 21 of the cartridge receiving cavity 9 and having a part which extends upwardly through an aperture 65 in the bottom 21 to provide an abutment end 64 which is moved by the inherent resilience of said spring 62, into a position below, i.e. out of the path of movement of the switch arm 60 when the main slide plate and the cartridge 12 are in their inoperative positions. The spring leaf 62 is formed with a projection 66 which lies in the path of a projection, not shown, on the main slide plate 36 so that when the main slide plate 36 and thus the cartridge 12 are moved into the operative position the abutment end 65 of the spring leaf 62 is urged in a direction substantially parallel with the pivot axis 58 of the bell-crank lever 57 against an under face of the ejector switch arm 60 and the spring leaf is stressed. As soon as the bell-crank lever 57 is pivotally moved to close the ejector switch 51 the abutment end 65 of the spring leaf "spring" up behind the ejector switch arm 60 to hold said arm in a position, maintaining the ejector switch 51 close to effect movement of the main slide plate 36 and cartridge 12, whereupon the projection on the main slide plate 36 and the spring leaf 62 disengage and allow the spring leaf 62 to return to a normal position in which its abutment end is withdrawn from behind the ejector switch arm thereby allowing the switch 51 to open.

The apparatus may be provided with switch means so that when the cartridge is automatically jected the apparatus is switched off so that the capstan spindle does not rotate.

In a tape playing apparatus of the type described the invention thus enables a cartridge to be ejected automatically at any predetermined instant such as at the end of a programme on the tape without the user having to concentrate on the apparatus.

I claim:

1. In an apparatus for tape provided as an endless loop, in a replaceable cartridge and including a magnetic transducer head engageable with the tape, a power driven capstan, a power driven capstan spindle engageable with the tape to provide the sole drive to the tape to transport the tape past the magnetic transducer head, a transporter means releasably engageable with said cartridge and operative to move said cartridge between an operative position wherein said tape is resiliently urged into contact with said capstan spindle and an inoperative position wherein said tape is spaced from said capstan spindle and biasing means biasing said cartridge in said operative position in the direction to urge said tape against said capstan spindle, the improvement comprising drive means to drive said transporter means from said capstan to cause said transporter means to move said cartridge between said positions and means disengaging said capstan from said drive means when said cartridge is in either of said positions, and trip means automatically operated when the tape has reached its predetermined playing position to cause the transporter means to move the cartridge from said operative to said inoperative position.

2. The improvement according to claim 1, wherein the trip means is arranged, when operated, to close an electrical switch whereby a first solenoid is operated to cause the transporter means to move the cartridge into its inoperative position.

3. The improvement according to claim 2, wherein the trip means includes a cam, means for rotating the cam, and a cam follower arranged to close said electrical switch after a predetermined amount of rotation of the cam.

4. The improvement according to claim 3, wherein the cam follower is a lever pivoted intermediate its ends and having two arms of which one arm engages the cam and the other arm actuates said electric switch.

5. The improvement according to claim 3 wherein the cam is operated by a pawl or click member operated by a second solenoid, which pawl or click member cooperates with teeth formed on the cam, said second solenoid being energised by means of an electrically conducting material provided at a predetermined position on the tape and which material engages two contact members as the tape is transported past the transducer head to complete an electrical circuit to said second solenoid.

6. The improvement according to claim 5, wherein the electrical conducting material is provided at the end of each track on the tape and the formation of the cam surface and number of teeth provided on the cam are arranged so that the cam follower is caused to operate said switch when all the tracks on the tape have been played.

7. The improvement according to claim 6, wherein the transporter means includes an abutment part lying parallel to the direction of movement thereof and to the axis of rotation of the capstan spindle and spaced from said spindle, and a pulley, movable by said first solenoid into the gap between said spindle and abutment part so as to rotate said pulley to drive the abutment part and hence the cartridge, which is releasably connected thereto from its operative to its inoperative position.

8. The improvement according to claim 7, wherein holding means are provided for the cam follower so that the cam follower is maintained in position, to continue to operate the switch to energise said first solenoid, after switch operating movement of the cam follower by the cam has ceased.

9. The improvement according to claim 8, wherein said holding means comprises a spring leaf having an abutment end which engages one arm of the cam follower and is normally biased so as to move into the path of said arm of the cam follower to prevent return of the cam follower to its original position after switch operating movement of the cam follower by said cam has ceased and said spring leaf having a projection which engages a part movable with said cartridge so that as said cartridge moves to its inoperative position said projection is engaged to displace the spring leaf out of the path of said arm to enable the cam follower to return to its original position.

References Cited

UNITED STATES PATENTS

| | | | |
|---|---|---|---|
| 3,343,687 | 9/1967 | Deighton et al. | 242—55.13 |
| 3,372,884 | 3/1968 | Nagano | 242—55.13 |
| 3,373,913 | 3/1968 | Atsumi | 226—176 |
| 3,395,871 | 8/1968 | Ackermann et al. | 242—55.13 |

ALLEN N. KNOWLES, Primary Examiner